(Model.)
J. & R. BEAN.
VEHICLE WHEEL.
No. 268,768. Patented Dec. 5, 1882.
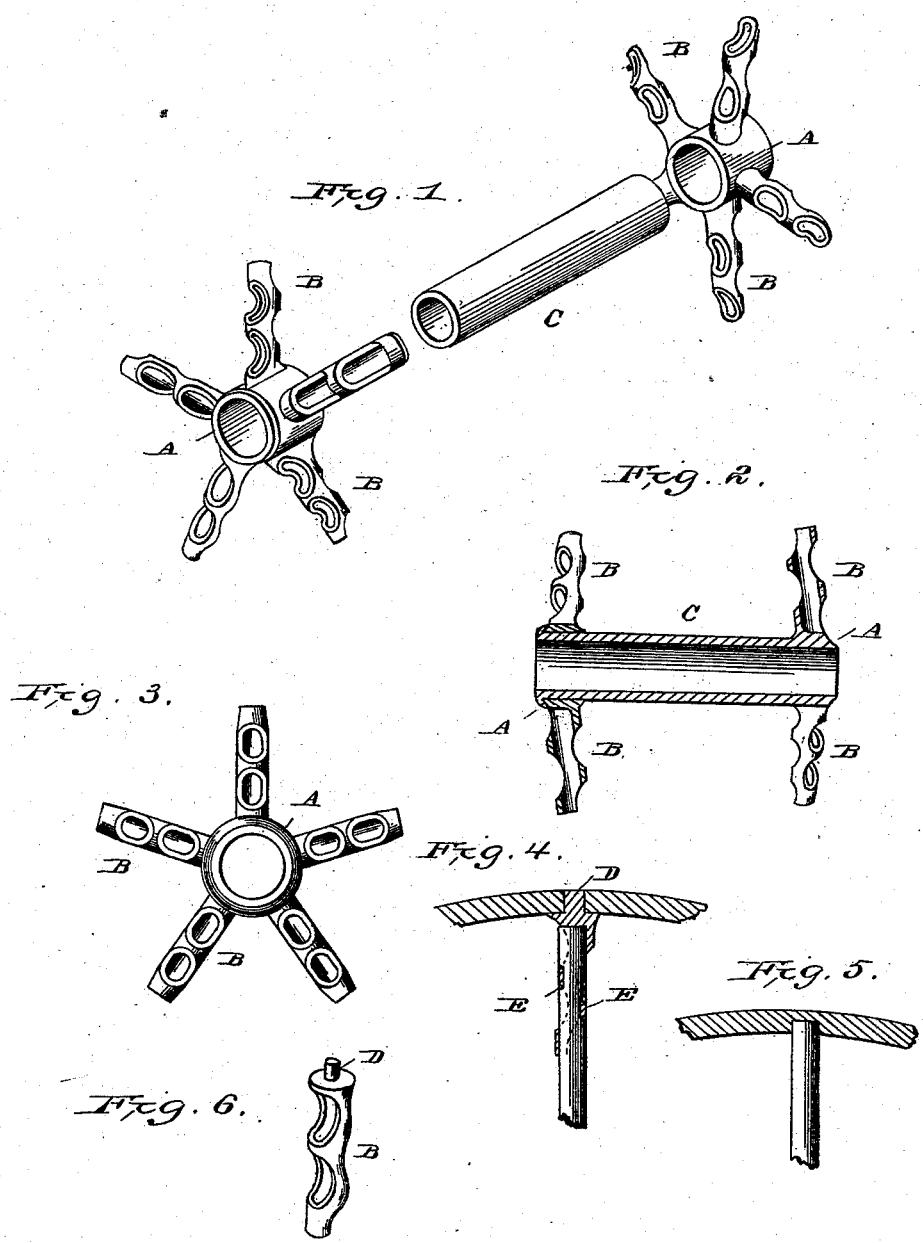
Witnesses.
Edwin L. Yerrell
H. A. Toulmin
Inventors
John Bean and Roscoe Bean.
C. M. Alexander.
Attorney.

UNITED STATES PATENT OFFICE.

JOHN BEAN AND ROSCOE BEAN, OF SPRINGFIELD, OHIO, ASSIGNORS TO THE TRICYCLE MANUFACTURING COMPANY, OF SAME PLACE.

VEHICLE-WHEEL.

SPECIFICATION forming part of Letters Patent No. 268,768, dated December 5, 1882.

Application filed September 5, 1882. (Model.)

*To all whom it may concern:*

Be it known that we, JOHN BEAN and ROSCOE BEAN, of Springfield, in the county of Clarke, and in the State of Ohio, have invented certain new and useful Improvements in Vehicle-Wheels; and we do hereby declare that the following is a full, clear, and exact description thereof, reference being had to the accompanying drawings, and to the letters of reference marked thereon, making a part of this specification.

This invention relates to certain improvements in vehicle-wheels of that class in which double hubs connected by a sleeve are employed; and it has for its objects to provide certain improvements in the construction and method of securing the hubs to the sleeve, and also to provide improved spoke-sockets for the hubs and for securing the spokes to the tire, as more fully hereinafter specified. These objects we attain by the means illustrated in the accompanying drawings, in which—

Figure 1 represents a perspective view, showing the hubs and the connecting-sleeve detached. Fig. 2 represents a sectional view, showing one hub cast upon the connecting-sleeve and the other fastened upon the end of the sleeve. Fig. 3 represents a side elevation of one of the hubs detached. Fig. 4 shows a sectional view of a portion of the wheel, taken longitudinally through one of the spokes, showing notches in said spokes, into which the spoke-sockets are fastened. Fig. 5 represents a similar view, showing the spokes fastened directly in the tire without the spoke-sockets; and Fig. 6, a perspective view of one of the spoke-sockets detached.

The letter A indicates the hubs of the wheel, having each a series of spoke-sockets, B. These sockets are peculiarly formed, each consisting of a short tube having openings on opposite sides, so arranged with respect to each other that they may be cast in one piece without a core, for the sake of convenience and economy. These spoke-sockets may be cast separately and secured to the hubs, or they may be cast with the hubs, as may be desired.

The letter C indicates the connecting-sleeve, which binds the hubs together, one hub being located at each end of the tube or sleeve. One of the hubs may be cast on or with the sleeve; but it is preferable to construct the hubs separately and secure them to the sleeve by riveting or by spreading or upsetting the metal of the sleeve at each end. The tire spoke-sockets are formed similarly to the hub-sockets except that they are invariably formed separately and have projections D at their ends, which are adapted to set in openings or recesses in the tire, by means of which they are attached to it. These tire-sockets are not indispensable, however, as the spokes may be set directly into recesses for the purpose on the inside of the tire, in which case the sockets will be unnecessary.

In constructing the wheel the spokes are inserted at one end into the sockets of one hub, which, as before stated, may be cast with or secured to the connecting-sleeve, the outer ends being placed in alternate recesses in the inside of the tire or in corresponding spoke-sockets secured to the tire. The spokes of the opposite hub are then inserted into its sockets, and the outer ends of the said spokes are set in the unoccupied recesses or spoke-sockets of the tire. The hub is then brought upon the end of the sleeve by forcing it toward the upper hub, and when properly on is riveted or secured to the sleeve by upsetting the end of the sleeve or spreading it, so as to hold the hub securely. This presses the spokes outward longitudinally, firmly binding all the parts together, forming a light and strong wheel.

In some instances the spoke may be recessed, as indicated by the letter E, and the parts between the lateral openings in the spoke-sockets may be flattened or forced into the recesses, so as to lock the spokes securely in the sockets. These recesses are not indispensable, however, and may be employed or not without departing from our invention.

Having thus described our invention, what we claim, and desire to secure by Letters Patent, is—

1. A spoke-socket for vehicle-wheels, consisting of a tube having openings on opposite sides, substantially as shown and described.

2. In a vehicle-wheel, a hub constructed with a series of spoke-sockets consisting of tubular radial extensions having lateral openings arranged as described, the whole cast in one piece, substantially as and for the purpose specified.

3. In a vehicle-wheel, the combination, with the tire, of a spoke-socket having openings at opposite sides and a tenon at the end adapted to fit in an aperture in the tire, substantially as specified.

4. In a vehicle-wheel, the combination of the hub constructed in two parts, said parts being provided with spoke-sockets having openings on opposite sides, as described, and the connecting-sleeve having one or both parts riveted or otherwise secured thereto at opposite ends, the whole virtually forming an integral hub ready for the spokes and tire, substantially as described.

5. In a vehicle-wheel, the combination, with the spoke-sockets constructed as described, of the slotted or recessed spokes, adapted to be secured in the sockets by flattening in the sides, substantially as specified.

In testimony whereof we affix our signatures, in presence of two witnesses, this 25th day of August, 1882.

JOHN BEAN.
ROSCOE BEAN.

Witnesses:
J. GUILFORD WHITE,
F. W. WILLISS.